US012682933B2

(12) United States Patent
Salamon et al.

(10) Patent No.:  US 12,682,933 B2
(45) Date of Patent:      Jul. 14, 2026

(54) GENERATIVE SOUND EFFECTS FOR VIDEO EDITING

(71) Applicant: ADOBE INC., San Jose, CA (US)

(72) Inventors: Justin Jonathan Salamon, San Francisco, CA (US); Prem Seetharaman, Sacramento, CA (US); Oriol Nieto-Caballero, Oakland, CA (US); Hugo Fernando Flores Garcia, Chicago, IL (US); Lee Brimelow, Bonney Lake, WA (US); Yaniv De Ridder, San Francisco, CA (US); Adolfo Hernandez Santisteban, Bothell, WA (US); Gabriela Duncombe, Houston, TX (US); Mary Le Tran, Berkeley, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/916,465

(22) Filed: Oct. 15, 2024

(65) Prior Publication Data

US 2026/0105934 A1     Apr. 16, 2026

(51) Int. Cl.
| | |
|---|---|
| *G11B 27/031* | (2006.01) |
| *G06F 3/04847* | (2022.01) |
| *G06F 40/40* | (2020.01) |
| *G06V 20/40* | (2022.01) |
| *G10K 15/02* | (2006.01) |

(52) U.S. Cl.
CPC ........ *G11B 27/031* (2013.01); *G06F 3/04847* (2013.01); *G06F 40/40* (2020.01); *G06V 20/46* (2022.01); *G10K 15/02* (2013.01)

(58) Field of Classification Search
CPC ... G11B 27/031; G06F 40/40; G06F 3/04847; G06V 20/46; G10K 15/02
See application file for complete search history.

(56) References Cited

U.S. PATENT DOCUMENTS

| | | | |
|---|---|---|---|
| 2014/0071137 A1* | 3/2014 | Kannan | G06T 13/205 345/473 |
| 2018/0330756 A1* | 11/2018 | MacDonald | G06F 16/951 |
| 2020/0314482 A1* | 10/2020 | Li | H04N 21/234363 |

OTHER PUBLICATIONS

Caillon, et al., "RAVE: A variational autoencoder for fast and high-quality neural audio synthesis", arXiv preprint arXiv:2111. 05011 [cs.LG] Dec. 15, 2021, 15 pages.
Evans, et al., "Long-form music generation with latent diffusion", arXiv preprint arXiv:2404.10301v2 [cs.SD] Jul. 29, 2024, 8 pages.
Peebles, "Scalable diffusion models with transformer", arXiv preprint arXiv:2212.09748v2 [cs.CV] Mar. 2, 2023, pp. 1-25.
Evans, et al., "Stable audio open", arXiv preprint arXiv:2407. 14358v2 [cs.SD] Jul. 31, 2024, 6 pages.

* cited by examiner

*Primary Examiner* — Mishawn N. Hunter
(74) *Attorney, Agent, or Firm* — F. CHAU & ASSOCIATES, LLC

(57)            ABSTRACT

A method, apparatus, non-transitory computer readable medium, and system for generating sound effects for a video includes obtaining a selection input indicating an element of a video. Embodiments then generate, using an audio generation model, a synthetic audio clip based on the selection input. Embodiments subsequently generate a multimedia file including the video and the synthetic audio clip.

20 Claims, 14 Drawing Sheets

Obtain a selection input indicating an element of a video
1205

Generate a synthetic audio clip based on the selection input
1210

Generate a multimedia file including the video and the synthetic audio clip
1215

1200

GENERATIVE SOUND EFFECTS FOR VIDEO EDITING

BACKGROUND

The following relates generally to sound processing, and more specifically to sound generation. Sound processing refers to the manipulation of an audio signal to achieve a desired result, typically through various adjustments made to the sound. These adjustments may include altering the volume, pitch, and speed of the audio, as well as applying effects such as reverb, equalization, and filtering. Sound processing techniques are widely used in a range of applications, from music production to audio for film and video, where users may enhance or modify audio tracks to better fit a particular context or to achieve a specific aesthetic.

Sound generation is a type of data generation that involves creating new audio content from various inputs or conditions. There are many techniques for generating data, including interpolation between existing data points and the use of deep learning models to synthesize new data. Sound generation can pose unique challenges due to the nature of audio data, which typically involves high sampling rates to capture fine details in the waveform. In some cases, users wish to incorporate new sounds into their creative workflows without browsing through libraries of stock sounds or operating specialist equipment.

SUMMARY

Embodiments of the present inventive concepts described herein include systems and methods for generating sound effects for a video. Embodiments receive a user selection on a timeline, which may be, for example, selecting a video clip on the timeline. Embodiments can then generate a sound effect corresponding to the selection. For example, embodiments include an audio generation model that can take cues from the entire frame of the video clip, a subject selected within the video clip, or a text prompt describing the desired sound. Some embodiments provide additional controls over the generation, such as allowing the user to adjust the volume profile over time, adjust the quality of the sound using automatically determined semantic aspects of the sound, and generate additional sounds that can be stacked on the first sound. Embodiments can further automatically align the sound with the selected video clip on the timeline. Embodiments then generate a multimedia file including the video and the generated sound(s). In this way, embodiments enable an "in place" timeline workflow for generating multimedia files.

A method, apparatus, non-transitory computer readable medium, and system for sound generation are described. One or more aspects of the method, apparatus, non-transitory computer readable medium, and system include obtaining a selection input indicating an element of a video; generating, using an audio generation model, a synthetic audio clip based on the selection input; and generating a multimedia file including the video and the synthetic audio clip.

A method, apparatus, non-transitory computer readable medium, and system for sound generation are described. One or more aspects of the method, apparatus, non-transitory computer readable medium, and system include displaying a video timeline interface for a video; obtaining, via the video timeline interface, a selection input indicating an element of the video; and generating, using an audio generation model, a synthetic audio clip based on the selection input.

An apparatus, system, and method for sound generation are described. One or more aspects of the apparatus, system, and method include a memory component; a processing device coupled to the memory component, the processing device configured to perform operations comprising: obtaining a selection input indicating an element of a video; generating, using an audio generation model, a synthetic audio clip based on the selection input; and generating a multimedia file including the video and the synthetic audio clip.

DETAILED DESCRIPTION

Figure 1:
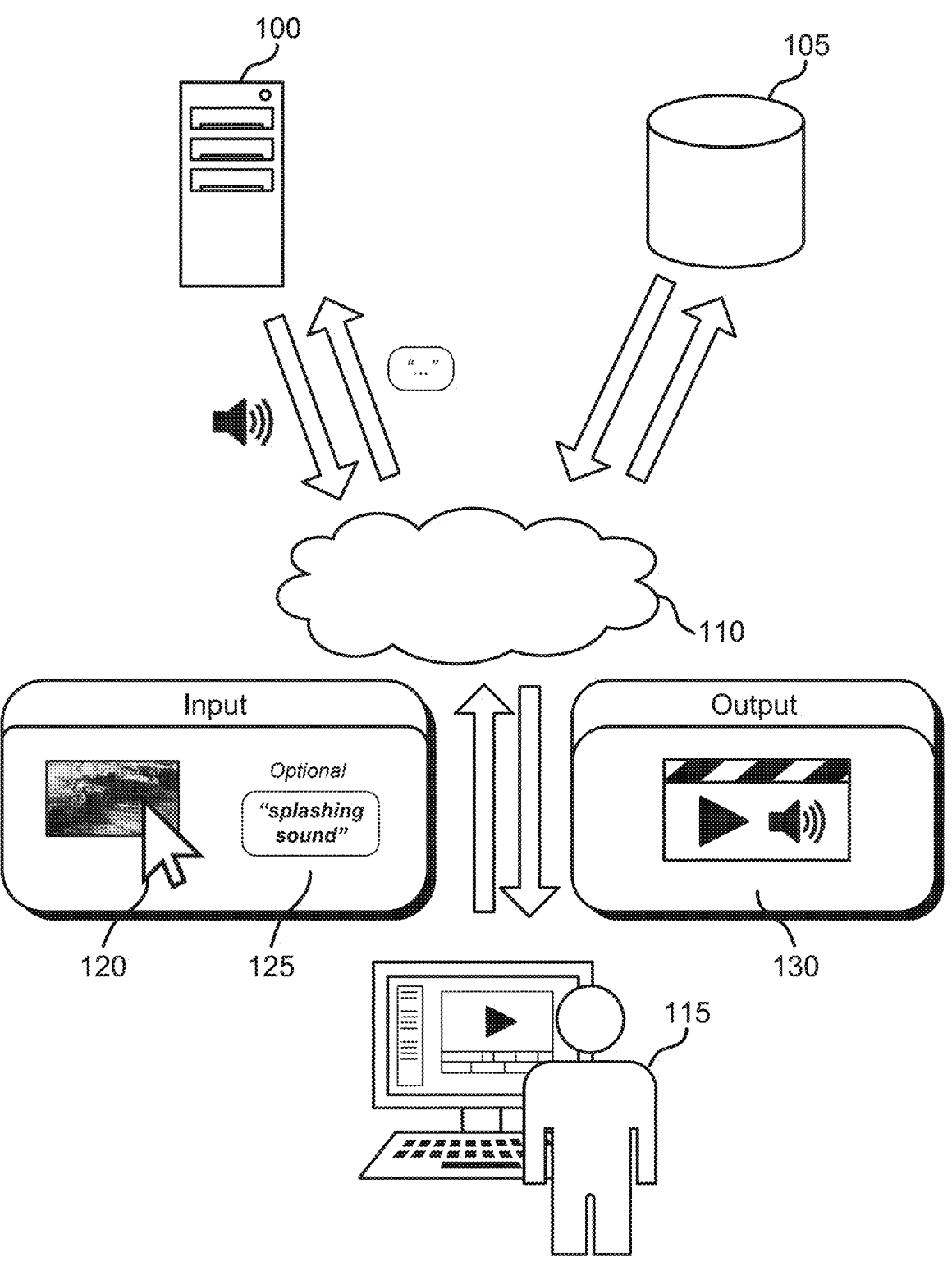
FIG. 1 shows an example of a sound processing system according to aspects of the present disclosure.

The following relates generally to sound processing, and more specifically to sound generation. Sound processing has recently become more common in creative workflows. Users may adjust various properties of audio, such as volume, pitch, speed, and apply effects like reverb, equalization, and filtering to manipulate the sound for a desired result. Sound generation, on the other hand, includes techniques such as rule-based interpolation, where new audio is created by estimating intermediate values between existing data points. More advanced methods, including machine learning (ML) techniques, are now used to generate entirely new sounds by learning from large datasets and predicting or synthesizing audio content.

ML is a field of data processing that focuses on building algorithms capable of learning from and making predictions or decisions based on data. It includes a variety of techniques, ranging from simple linear regression to complex neural networks, and plays a significant role in automating and optimizing tasks that would otherwise require extensive human intervention.

Users often interface with a timeline when creating multimedia projects. This typically involves curating their own image, video, and audio content by arranging various media elements along a time axis. In some cases, timeline interfaces may provide a stock search feature, allowing users to browse and import media assets directly within the timeline environment.

However, stock databases may not include the content users are seeking or may be inaccessible even after several searches. Very recently, methods have emerged that allow users to generate image content within the timeline interface for use as assets in their multimedia projects. However, video generation and sound generation are still in their infancy, and users generally have to access external programs or websites to generate such content. These external approaches often do not take into account the specific context of the multimedia project within the timeline. Accordingly, in some cases, the generated content does not align properly with the media assets already in the project.

Embodiments of the present disclosure improve the accuracy of generated media, and particularly of generated sound effects, by enabling "in-place" generation of sound effects that are based on a user's selection within a timeline. Embodiments, for example, can condition the generation of the sound effects based on one or more elements from a selected video clip, and can generate synthetic audio that aligns with the video on the timeline. Embodiments are further configured to receive a text prompt as conditioning and generate the synthetic audio therefrom. In cases, embodiments can receive instructions to change the audio clip as text, and generate a new audio clip, using both the features from the text instructions and the original audio clip as conditioning. Embodiments further increase user control over their generation by providing interfaces for adjustments to sound dynamics and semantic aspects.

A sound processing system is described with reference to FIGS. 1-4. Various states of a graphical user interface (GUI) operable to control the functionality of the sound processing system is described with reference to FIGS. 5-10. Methods for generating a multimedia file are described with reference to FIGS. 11-12. Training data preparation methods as well as a machine learning model algorithm are described with reference to FIG. 13. A computing device configured to implement a sound processing apparatus is described with reference to FIG. 14.

Sound Processing System

FIG. 1 shows an example of a sound processing system according to aspects of the present disclosure. The example shown includes sound processing apparatus 100, database 105, network 110, user 115, timeline selection 120, guidance input 125, and multimedia file 130.

In one example, user 115 provides operates a GUI to provide timeline selection 120, which may be, for example, a selection of a video clip in a timeline of the GUI. The user may optionally provide a text input, where the text input describes a sound, the user wishes to generate. Then sound processing apparatus 100 processes the input(s) to generate a synthetic audio clip. The sound processing apparatus 100 may join the audio clip to the video clip, and render both as multimedia file 130 before outputting multimedia file 130 to the user.

In some embodiments, all or part of sound processing apparatus 100 is implemented on a server. A server provides one or more functions to users linked by way of one or more of the various networks. In some cases, the server includes a single microprocessor board, which includes a microprocessor responsible for controlling all aspects of the server. In some cases, a server uses microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a super computer, or any other suitable processing apparatus.

Database 105 stores information used by the sound processing system, such as stock media, synthesized audio, model parameters, configuration files, instructions executable by the sound processing apparatus 100, and the like. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, a user interacts with a database controller. In other cases, the database controller may operate automatically without user interaction.

Network 110 is used to facilitate the transfer of information between sound processing apparatus 100, database 105, and user 115. Network 110 is sometimes referred to as the "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
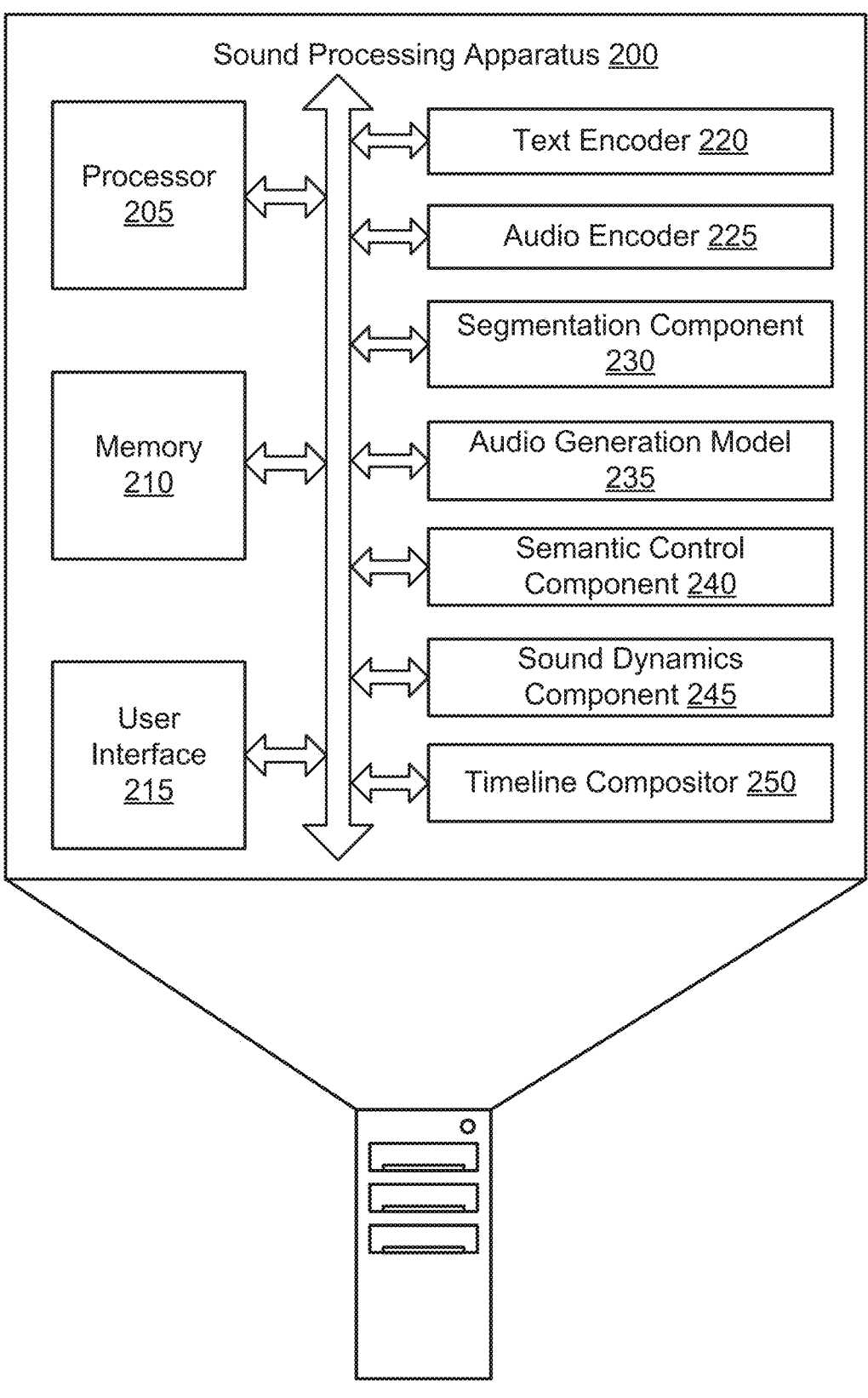
FIG. 2 shows an example of a sound processing apparatus according to aspects of the present disclosure.

FIG. 2 shows an example of a sound processing apparatus 200 according to aspects of the present disclosure. The example shown includes sound processing apparatus 200, processor 205, memory 210, user interface 215, text encoder 220, audio encoder 225, segmentation component 230, audio generation model 235, semantic control component 240, sound dynamics component 245, and timeline compositor 250.

Processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor 205 is configured to operate a memory array using a memory controller. In other cases, a memory controller is integrated into processor 205. In some cases, processor 205 is configured to execute computer-readable instructions stored in memory 210 to perform various functions. In some embodiments, processor 205 includes special purpose components for modem processing, baseband processing, digital signal processing, or transmission processing.

Memory 210 stores information used in the operation of sound processing apparatus 200. Examples of a memory device include random access memory (RAM), read-only memory (ROM), or a hard disk. Examples of memory devices include solid state memory and a hard disk drive. In some examples, memory 210 is used to store computer-readable, computer-executable software including instructions that, when executed, cause processor 205 to perform various functions described herein. In some cases, memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 210 store information in the form of a logical state.

A user interface 215 may enable a user to interact with a device. In some embodiments, the user interface 215 may include an audio device, such as an external speaker system, an external display device such as a display screen, or an input device (e.g., remote control device interfaced with the user interface 215 directly or through an IO controller module). In some cases, a user interface 215 may be a graphical user interface 215 (GUI).

A GUI is a form of user interface that allows users to interact with a device through graphical elements displayed on a screen. The GUI may include components such as buttons, sliders, menus, and timelines, which provide visual and interactive elements for user input and control. In some cases, the GUI may be displayed on external devices such as monitors or touchscreen interfaces, allowing users to manipulate and manage digital content, including multimedia projects. The GUI provides a user-friendly means of interacting with the system. In some embodiments, the GUI includes a timeline.

A timeline is a GUI component used to display and manage the current state of a multimedia project. It visually represents time-varying data, such as video clips, audio tracks, and graphical elements, along a linear axis corresponding to time. The timeline provides users with an intuitive way to view, edit, and organize the various elements of their project across different time intervals. The timeline also offers various controls that allow users to perform tasks such as adding, deleting, and rearranging media elements. Users can adjust the start and end times of media tracks, modify the order of overlapping media, and preview how the different components will play back together in the final composition. Additionally, the timeline may support features like zooming for detailed frame-level editing, snapping to keyframes or other media elements for precise alignment, and layer management to handle media with different levels of priority or visibility. In some embodiments, the timeline includes playback controls for previewing the project, as well as markers or annotations to aid in organizing and synchronizing media. This allows users to easily navigate complex multimedia projects and make precise adjustments to the timing and sequencing of media elements. Examples of GUIs that depict a timeline are described with reference to FIGS. 6-7 and 10.

Text encoder 220 is a component configured to process an input text and generate a corresponding text embedding. A text embedding is a numerical representation of the input text that captures its semantic meaning in a format suitable for machine learning models. This embedding can be used by the system to condition the generation of sounds, guiding the output to align with the meaning or context provided by the text input. In various embodiments, the text encoder 220 may include transformer-based architectures such as Flan-T5, sentenceBERT, and the CLIP text encoder 220, each of which is designed to efficiently encode text into high-dimensional embeddings that are compatible with downstream tasks, such as data generation.

Audio encoder 225 is configured to process an input waveform of audio, which typically has a high sample rate (e.g., 44,100 Hz), and generate tokenized embeddings in a latent space at a wider sampling rate, such as 40 Hz. This transformation reduces the complexity of the audio data while retaining essential features, enabling efficient processing and generation tasks. In some embodiments, audio encoder 225 is based on a variational auto-encoder (VAE) architecture, which learns to encode the audio into a compressed latent representation that can be used in downstream tasks like audio generation or transformation. An example operation of audio encoder 225 is described with reference to FIG. 3.

Segmentation component 230 is configured to identify an object within an image and assign a corresponding region and label to the object. In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

In some embodiments, segmentation component 230 may include models such as SAM (Segment Anything Model), SEM (Segment Everything Model), or YOLO (You Only Look Once). These models may be configured to segment and label foreground and background elements within an image. In some embodiments, a user can press a button labeled "select subject" or similar, and segmentation component 230 will automatically identify the pixels of the current displayed frame in the timeline corresponding to the subject. Segmentation component 230 may send this information to an image encoder to obtain features that can be used to condition the generation of audio.

Audio generation model 235 is configured to generate synthetic audio. Embodiments of audio generation model 235 include a diffusion transformer (DiT) model. Accordingly, some embodiments of audio generation model 235 can generate audio samples of arbitrary length, unconditionally, by performing an iterative denoising process. Embodiments of audio generation model 235 are further configured to generate audio based on some condition, such as text, images, or another audio clip. Some embodiments are further configured to extend an existing audio clip via an inpainting or outpainting process, which involves appending noise token embeddings to token embeddings of the existing audio clip, and then performing the iterative denoising process. An example of audio generation model 235 is described with reference to FIG. 4.

According to some aspects, audio generation model 235 generates a synthetic audio clip based on a selection input. In some examples, audio generation model 235 generates an additional synthetic audio clip based on the semantic adjustment input. In some examples, audio generation model 235 generates an additional synthetic audio clip, where the multimedia file includes the synthetic audio clip and the additional synthetic audio clip.

Semantic control component 240 is configured to generate one or more semantic dimensions for editing a sound. For example, when audio generation model 235 is prompted to generate a sound based on a text prompt, such as "a thundering rainstorm," the adjustable dimensions may include "thunder" and "rain". Embodiments of semantic control component 240 include a language model configured to extract elements from a text prompt. Embodiments are not limited thereto, however, and some embodiments of semantic control component 240 may include a sound-to-text mode configured to extract such aspects directly from a generated sound. A GUI element is provided that allows the user to adjust sliders corresponding to these dimensions. When the user modifies these sliders, the text encoder 220 re-generates the text features, applying weights that reflect the user's adjustments. The re-generated sound will then place more or less emphasis on the selected aspects, such as increasing or decreasing the prominence of thunder or rain in the sound. An example of this GUI element is described with reference to FIG. 9.

Sound dynamics component 245 modulates various attributes of a sound based on user preferences. For example, sound dynamics component 245 may present a graphical user interface (GUI) element that allows the user to define an equalization (EQ) profile (e.g., for the overall sound) or a volume profile (e.g., adjusting volume over the duration of the sound). This can be done either before the sound is generated or when regenerating the sound. An example of this GUI component is described with reference to FIG. 8.

Timeline compositor 250 maintains a model of a multimedia project, including starting and ending times for a plurality of time-varying data, such as video clips and sounds, as well as an order hierarchy of the time-varying data. Timeline compositor 250 is configured to align generated sounds from audio generation model 235 with a corresponding video clip in a timeline interface. The timeline interface allows users to manage multiple media tracks, including audio and video. In some embodiments, the alignment of the generated sounds is based on a user-configurable "timeline sync" setting, which allows for precise control over the synchronization between the audio and video content, placing the sound at the correct time within the timeline.

Figure 3:
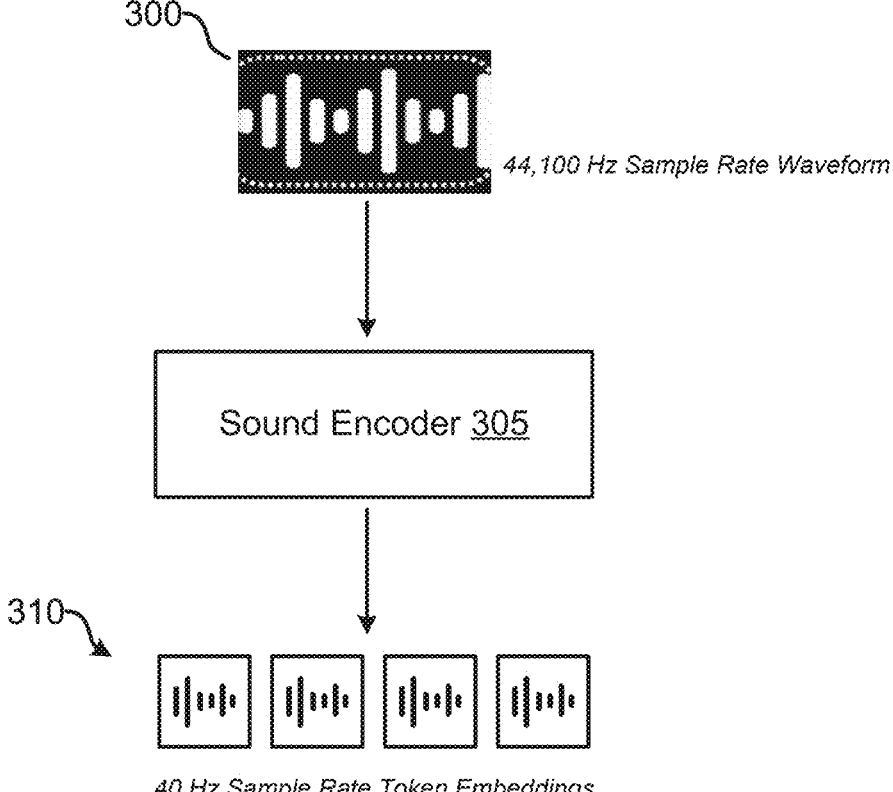
FIG. 3 shows an example of an audio encoder according to aspects of the present disclosure.

FIG. 3 shows an example of an audio encoder according to aspects of the present disclosure. The example shown includes input sound 300, sound encoder 305, and tokenized sounds 310.

Input sound 300 is a waveform at a high sampling rate, such as 44,100 Hz. Sound encoder 305 processes this waveform to generate tokenized embeddings, represented as tokenized sounds 310, at a lower sampling rate such as 40 Hz. The sound encoder 305 may be based on a variational auto-encoder (VAE) architecture, which compresses the high-frequency input data into a latent representation that retains the essential characteristics of the sound while reducing its complexity. The VAE achieves this by learning a probabilistic model of the audio data that maps the continuous audio waveform into discrete tokens that can efficiently represent the content over a wider sampling rate. These tokens can then be used for further processing, such as audio generation or transformation tasks.

Figure 4:
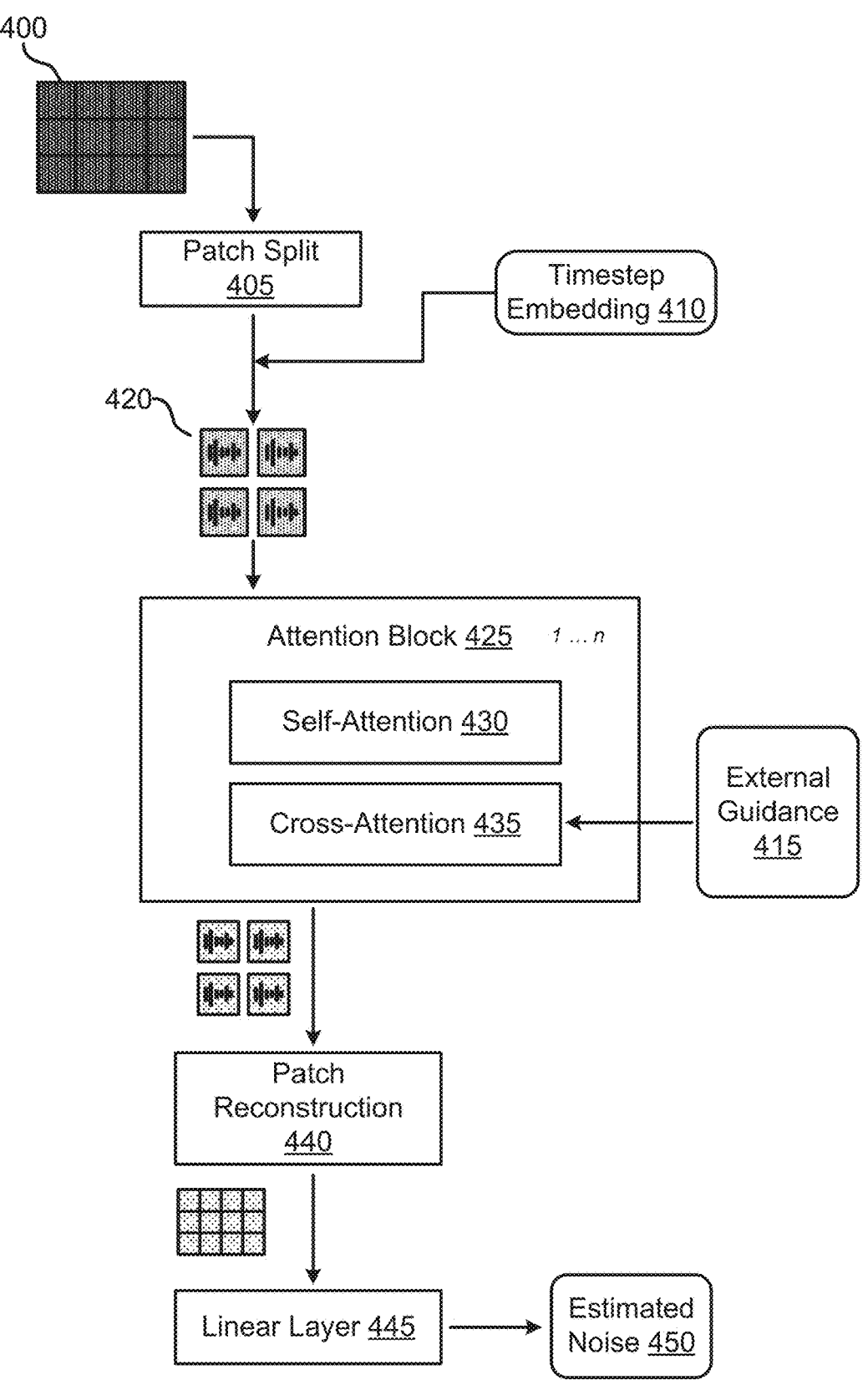
FIG. 4 shows an example of a diffusion transformer model according to aspects of the present disclosure.

FIG. 4 shows an example of a diffusion transformer model (DiT) according to aspects of the present disclosure. The example shown includes noisy latent 400, patch split 405, timestep embedding 410, external guidance 415, noise tokens 420, attention block 425, patch reconstruction 440, linear layer 445, and estimated noise 450. In one aspect, attention block 425 includes self-attention 430 and cross-attention 435.

The process begins with noisy latent 400, which is split into smaller units using patch split 405, producing noise tokens 420. Timestep embedding 410 is added to noise tokens 420 to provide temporal context for each token. The combined input is then passed to attention block 425.

Attention block 425 includes self-attention 430, which relies on the tokens from either the previous attention block in the sequence or, if at the beginning of the sequence, from the previous iteration's attention block. If it is the first iteration, self-attention 430 operates on the initial noise tokens 420 produced from the patch split of noisy latent 400. Cross-attention 435 receives features from external guidance 415, which may include tokens corresponding to text features, image features (e.g., from a selected subject in a still frame of a video clip), or other audio features. These features could be influenced by an uploaded or recorded audio clip, allowing a user to specify additional context for the sound generation. The combination of self-attention 430 and cross-attention 435 processes the tokens, denoising them and incorporating the external guidance.

The output of attention block 425 is denoised tokens, which are passed to patch reconstruction 440. Patch reconstruction 440 combines the tokens back into a latent representation, producing a denoised latent. This denoised latent is then processed by linear layer 445, which generates estimated noise 450. Estimated noise 450 may be a tensor that can be used to adjust the latent code before the next diffusion generation, and it serves as the basis for generating synthetic data. The process can repeat over multiple iterations, refining the sound by progressively reducing the noise through further attention operations.

In at least one embodiment, the audio generation model is based on a U-Net. In this case, the denoising process relies on convolution operations applied to the noisy latent, gradually refining the latent representation through multiple layers of the network. Attention operations in this architecture are primarily used to incorporate external conditions, such as text features, into the generation process, rather than being directly involved in the denoising.

Figure 5:
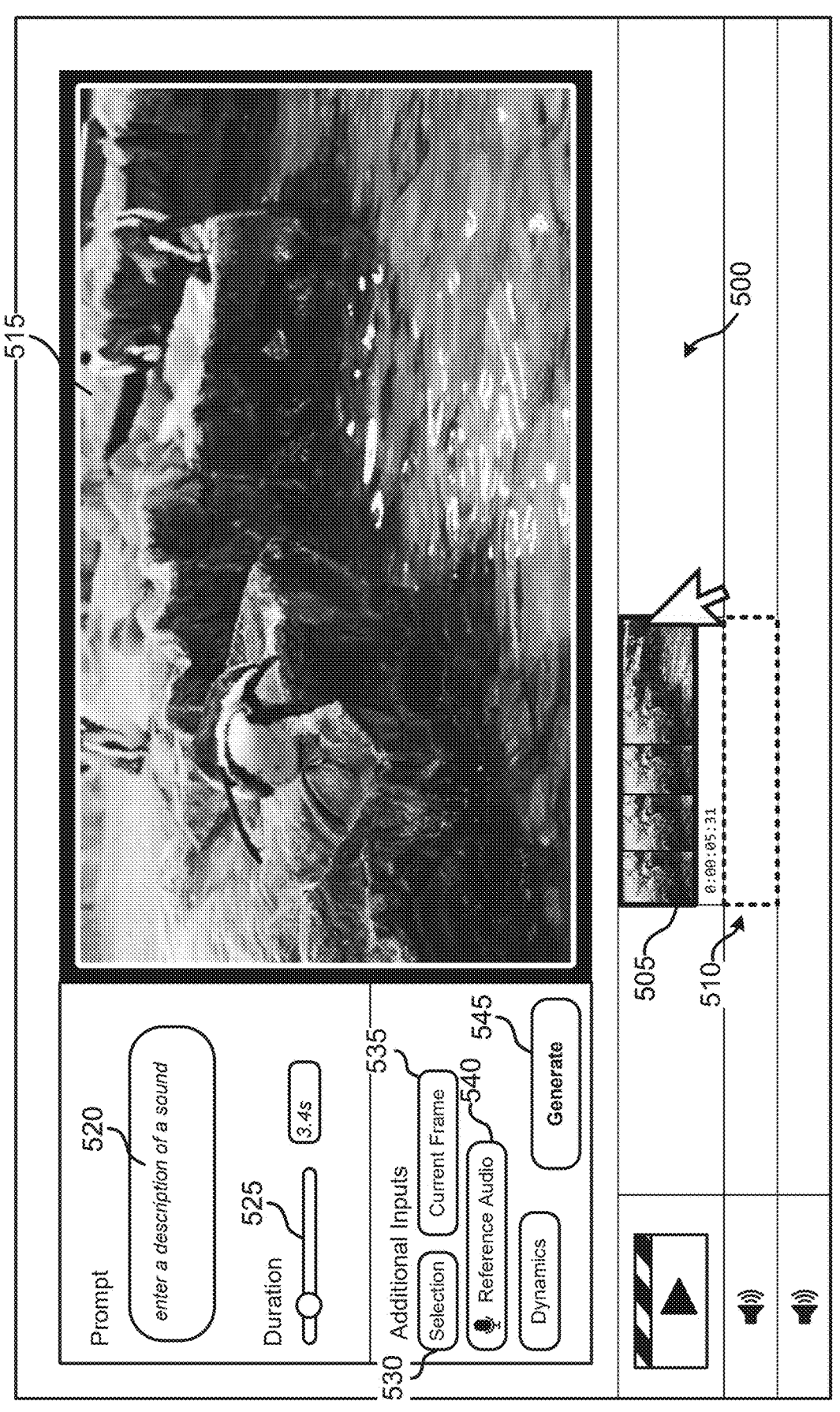
FIG. 5 shows an example of an initial graphical user interface according to aspects of the present disclosure.

FIG. 5 shows an example of an initial graphical user interface (GUI) according to aspects of the present disclosure. The example shown includes video timeline 500, selected video clip 505, audio destination 510, current frame 515, prompt input 520, duration input 525, selection input 530, ambiance input 535, reference audio input 540, and generate button 545.

As discussed with reference to FIG. 2, video timeline 500 is a GUI component used to display and manage the current state of a multimedia project. It visually represents time-varying data, such as video clips, audio tracks, and graphical elements, along a linear axis corresponding to time. A user may select a clip on the timeline, such as selected video clip 505, to display a representative frame (e.g., the first frame)

of selected video clip 505 in the center of the GUI. For example, current frame 515 depicts a penguin about to jump into the water.

In this example, the user does not yet have a sound associated with selected video clip 505. Accordingly, the user can operate the GUI to generate a sound. The user may input a text description of the sound they wish to generate prompt input 520, or prompt the system to generate a sound based on current frame 515 by selecting ambiance input 535. The user may also prompt the system to select an element on the screen, e.g., perform subject detection, by selecting selection input 530. This process prompts a segmentation component as described with reference to FIG. 2 to identify pixels of current frame 515 corresponding to a subject. The user may also supply a reference audio via reference audio input 540, which prompts the user to either upload, select, record, or otherwise identify a reference audio for conditioning the audio generation.

Once the user has identified one or more conditions for sound generation, the user may press generate button 545 to prompt the system to generate synthesized audio. The user may also set a duration for the audio via duration input 525. In some embodiments, the sound processing system defaults to a duration corresponding to the length of the selected video clip.

Figure 6:
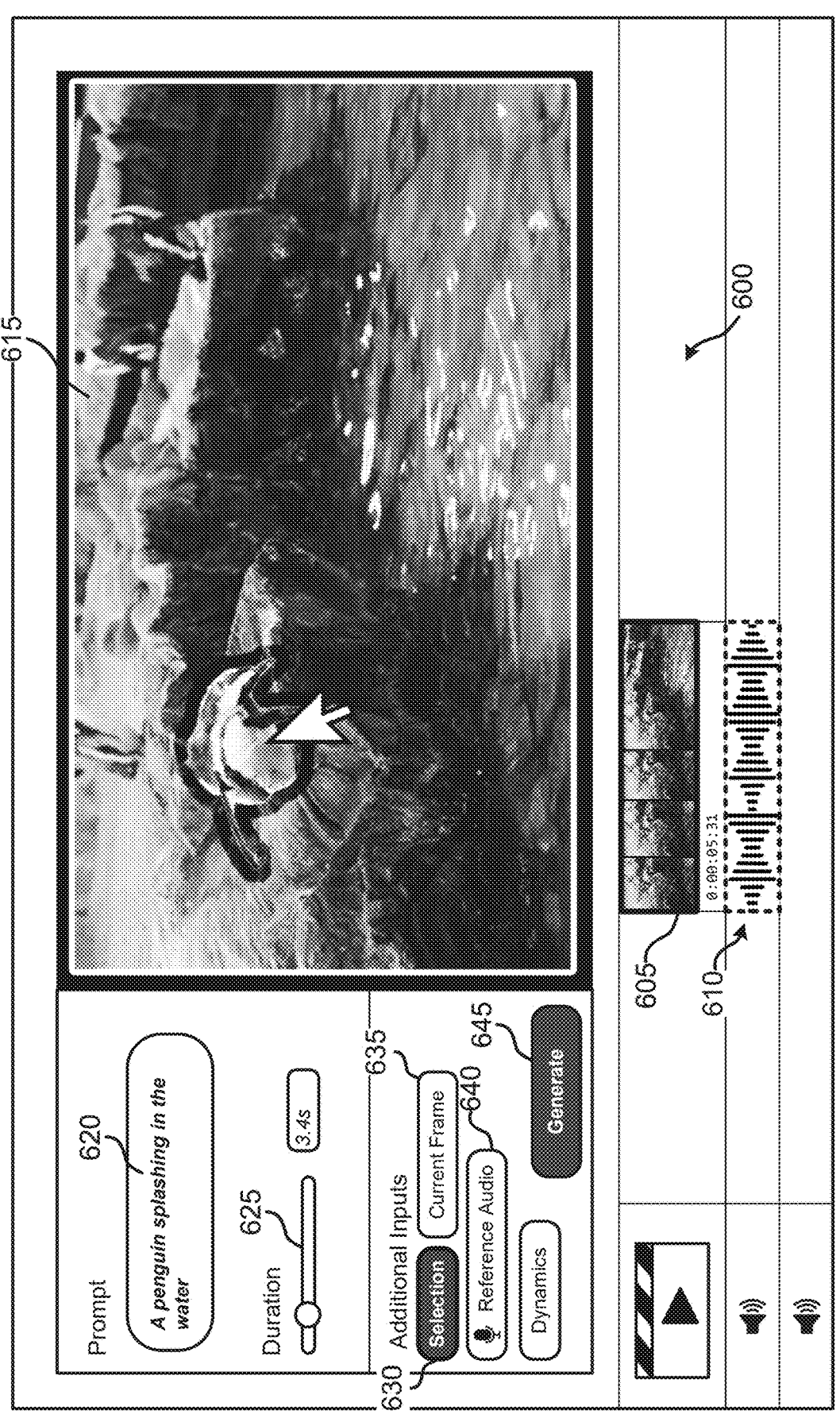
FIG. 6 shows an example of a graphical user interface after selecting an image element according to aspects of the present disclosure.

FIG. 6 shows an example of a graphical user interface after selecting an image element according to aspects of the present disclosure. The example shown includes video time-line 600, selected video clip 605, audio destination 610, current frame 615, prompt input 620, duration input 625, selection input 630, ambiance input 635, reference audio input 640, and generate button 645.

The elements depicted in FIG. 6 are the same as or similar to components depicted in FIG. 5. Accordingly, redundant description thereof may be omitted.

In this example, the user has pressed selection input 630. At this point, the sound processing system may automatically select a subject of current frame 615, or may prompt the user to click somewhere on current frame 615 to provide a query point to a segmentation model to identify a subject in the clicked location. In this example, the user has selected the penguin near the center of the screen, and then pressed generate button 645. The selection action causes the sound processing system to send the image data corresponding to the penguin to an image encoder to generate an image embedding, which is then decoded by, for example, an image-to-text model such as CLIP to generate a text prompt. The generated text prompt replaces the default text in prompt input 620. The audio generation model then uses this generated text prompt to generate synthetic audio, which is placed in audio destination 610. The audio destination 610 aligns with the start and end of selected video clip 605, though different audio durations and timecodes are configurable by the user. In at least one embodiment, the sound processing system may utilize the image embedding directly as conditioning for the generation of the sound.

Figure 7:
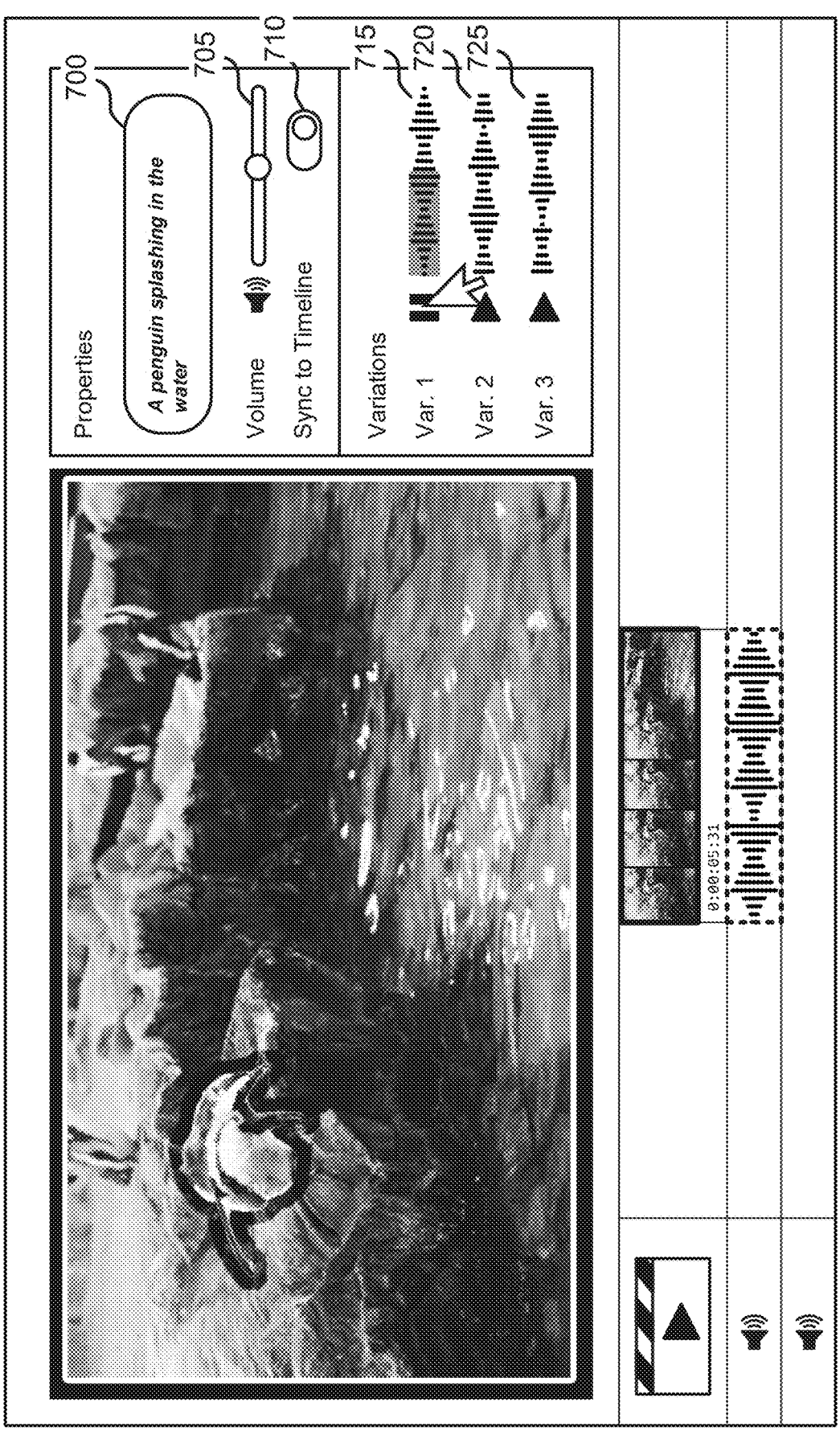
FIG. 7 shows an example of a GUI element for displaying variations of a sound according to aspects of the present disclosure.

FIG. 7 shows an example of a GUI element for displaying variations of a sound according to aspects of the present disclosure. The example shown includes sound prompt 700, volume adjustment element 705, timeline sync toggle 710, first variation 715, second variation 720, and third variation 725.

After the user has generated a sound based on one or more inputs as described with reference to FIG. 7, the prompting/input GUI window may be minimized, and the window illustrated on the right of FIG. 7 may appear. This GUI element enables a user to choose different variations of the generated sound. For example, first variation 715 may be placed in the timeline by default. The user may play first variation 715, second variation 720, and third variation 725 to determine which variation is to their liking, and drag it to the timeline. Sound prompt 700 provides a record of the prompt used in generation, and volume adjustment element 705 allows the user to adjust the volume of their selected variation. Timeline sync toggle 710 is a togglable element that, when set to 'ON', ensures that the generated sound is generated with a start point and duration that matches the selected video clip.

Figure 8:
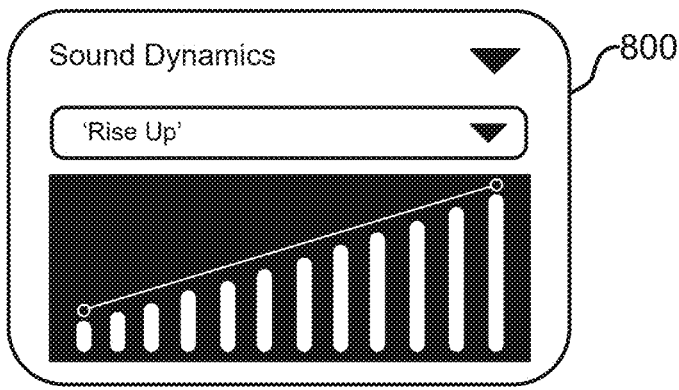
FIG. 8 shows an example of a GUI element for adjusting sound dynamics according to aspects of the present disclosure.
Figure 8:
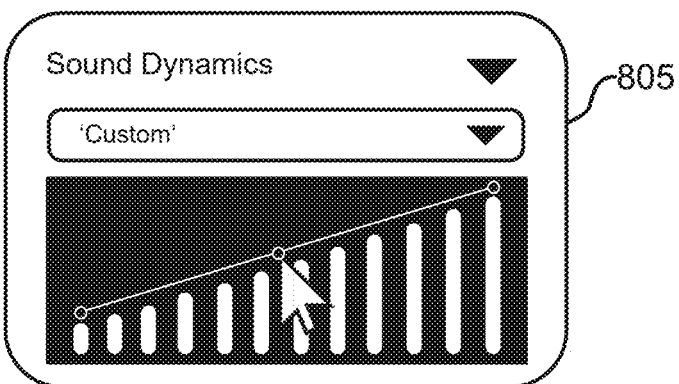
Figure 8:
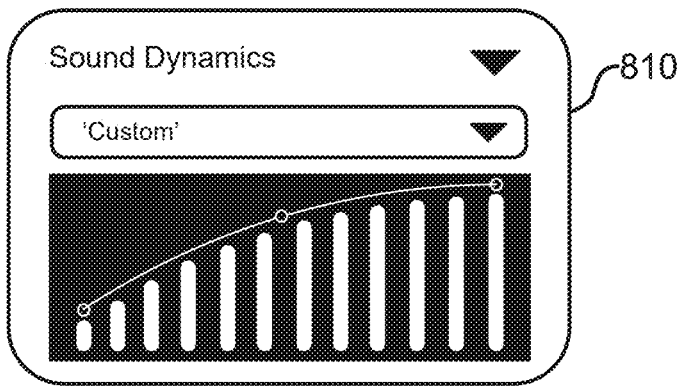

FIG. 8 shows an example of a GUI element for adjusting sound dynamics according to aspects of the present disclosure. The example shown includes 'rise up' dynamics profile 800, 'custom' dynamics profile 805, and user-provided sound envelope 810.

'Rise up' dynamics profile 800 illustrates a pre-defined sound dynamics profile, labeled "Rise Up," selected from a dropdown menu. Below this, a series of bars is displayed, with each bar representing the volume of the generated audio over time. The bars start at a lower height and progressively increase in height, indicating that the volume starts low and rises over time. Above the bars, a line is displayed, with adjustable elements at both ends of the line. The volume bars rise up to meet the line, visually showing the increasing volume of the audio.

'Custom' dynamics profile 805 depicts a custom profile selected from the dropdown menu. The profile is automatically updated to "Custom" because the user has added an adjustable element to the center of the line by clicking on it. At this stage, no changes have been made to the volume profile itself, but the added adjustable element allows the user to modify the dynamics.

User-provided sound envelope 810 shows the custom profile after the user has interacted further with the GUI. The user has dragged the center point upwards, transforming the line into a curve. The bars below the line adjust accordingly, rising up to meet the curve. This demonstrates how the user can manipulate the dynamics of the sound, both before and after generation, by naturally adjusting the curve to control the sound's volume envelope over time. In some embodiments, the user may make additional adjustments by adding, deleting, and dragging the adjustable elements to affect other sound dynamics, such as EQ.

Figure 9:
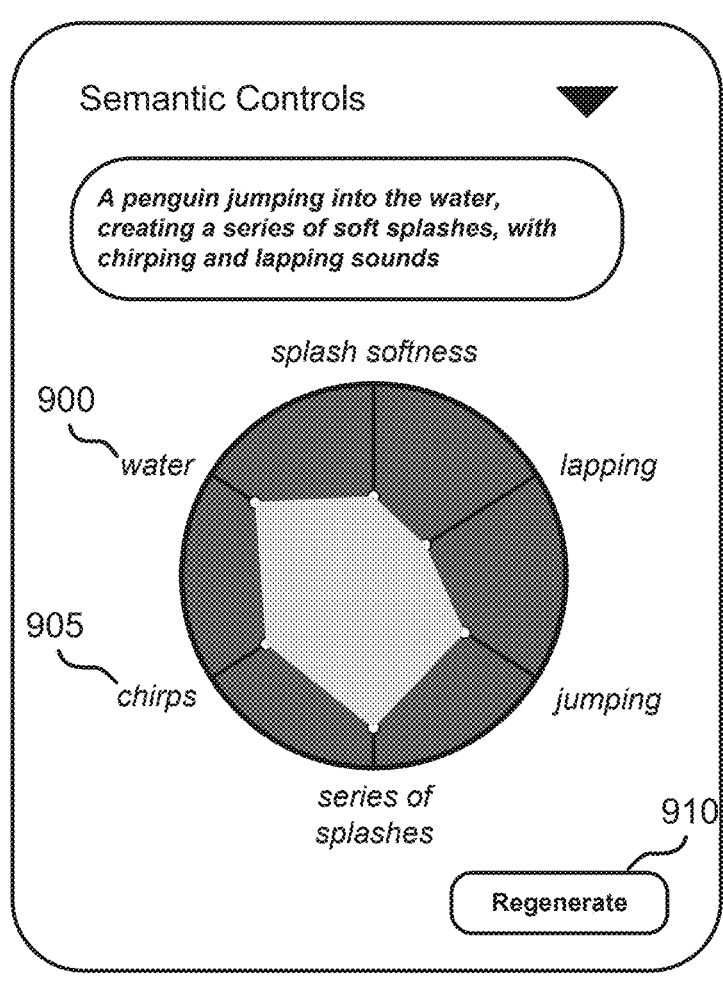
FIG. 9 shows an example of a GUI element for semantic controls according to aspects of the present disclosure.

FIG. 9 shows an example of a GUI element for semantic controls according to aspects of the present disclosure. The example shown includes first sound dimension 900, second sound dimension 905, and regenerate button 910.

The GUI element is titled "Sound Dynamics" and displays the prompt used to generate the sound for reference. In this example, the prompt is "a penguin jumping into the water, creating a series of soft splashes, with chirping and lapping sounds." Below the prompt, a circular shape with a polygon in the middle is shown. The polygon is formed by adjusting control points constrained to different axes. Each axis corresponds to an aspect of the generated sound, automatically determined by the semantic control component as described with reference to FIG. 2.

First sound dimension 900 refers to the "water" axis, which represents the water-related sounds in the generated audio. Second sound dimension 905 refers to the "chirps" axis, which relates to the chirping sounds. Other axes in this example, such as "splash softness," "series of splashes," "jumping," and "lapping," reflect additional aspects of the sound that were derived from the prompt. These axes allow the user to adjust the emphasis of specific sound features by dragging the control points along each axis, which in turn adjusts the underlying semantic dimensions.

At the bottom of the GUI, the regenerate button 910 allows the user to regenerate the sound with updated parameters based on their adjustments to the sound dimensions. The changes to the polygon shape reflect the user's modifications to the semantic controls, enabling real-time adjustment and re-generation of the sound. In at least one embodiment, a sound-to-text model is used to directly determine the semantic dimensions from the generated sound without an associated text prompt.

Figure 10:
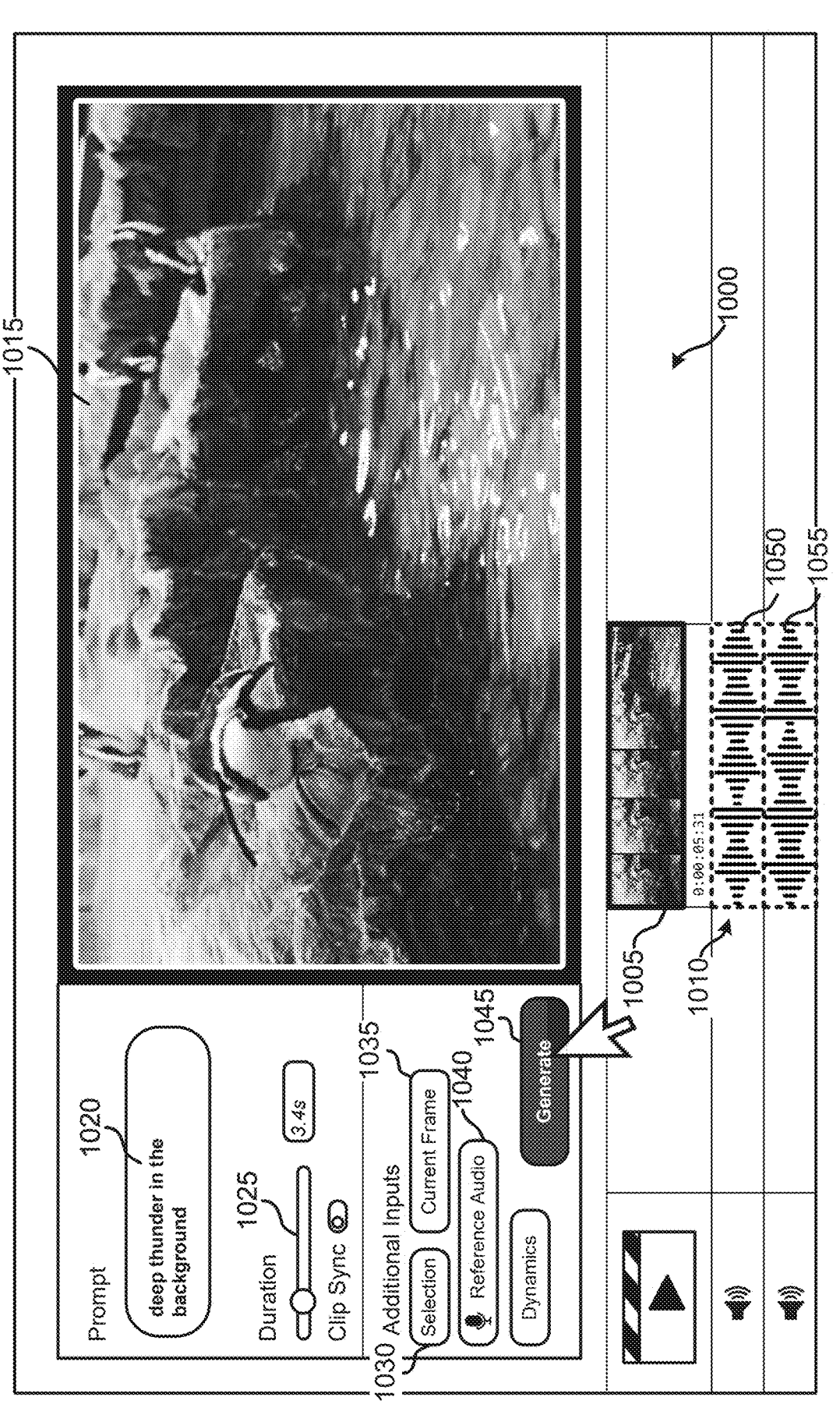
FIG. 10 shows an example of a graphical user interface after generating an additional sound according to aspects of the present disclosure.

FIG. 10 shows an example of a graphical user interface after generating an additional sound according to aspects of the present disclosure. The example shown includes video timeline 1000, selected video clip 1005, audio destination 1010, current frame 1015, prompt input 1020, duration input 1025, selection input 1030, ambiance input 1035, reference audio input 1040, generate button 1045, first sound 1050, and second sound 1055.

The elements depicted in FIG. 10 are the same as or similar to components depicted in FIGS. 5 and 6. Accordingly, redundant description thereof may be omitted. In this example, a user has generated an initial sound, first sound 1050, as discussed with reference to FIGS. 5 and 6. The user may maintain their selection of selected video clip 1005, and operate the controls depicted in the GUI to generate an additional sound. In this case, the sound processing apparatus will place second sound 1055 beneath first sound 1050, aligned with selected video clip 1005.

Figure 11:
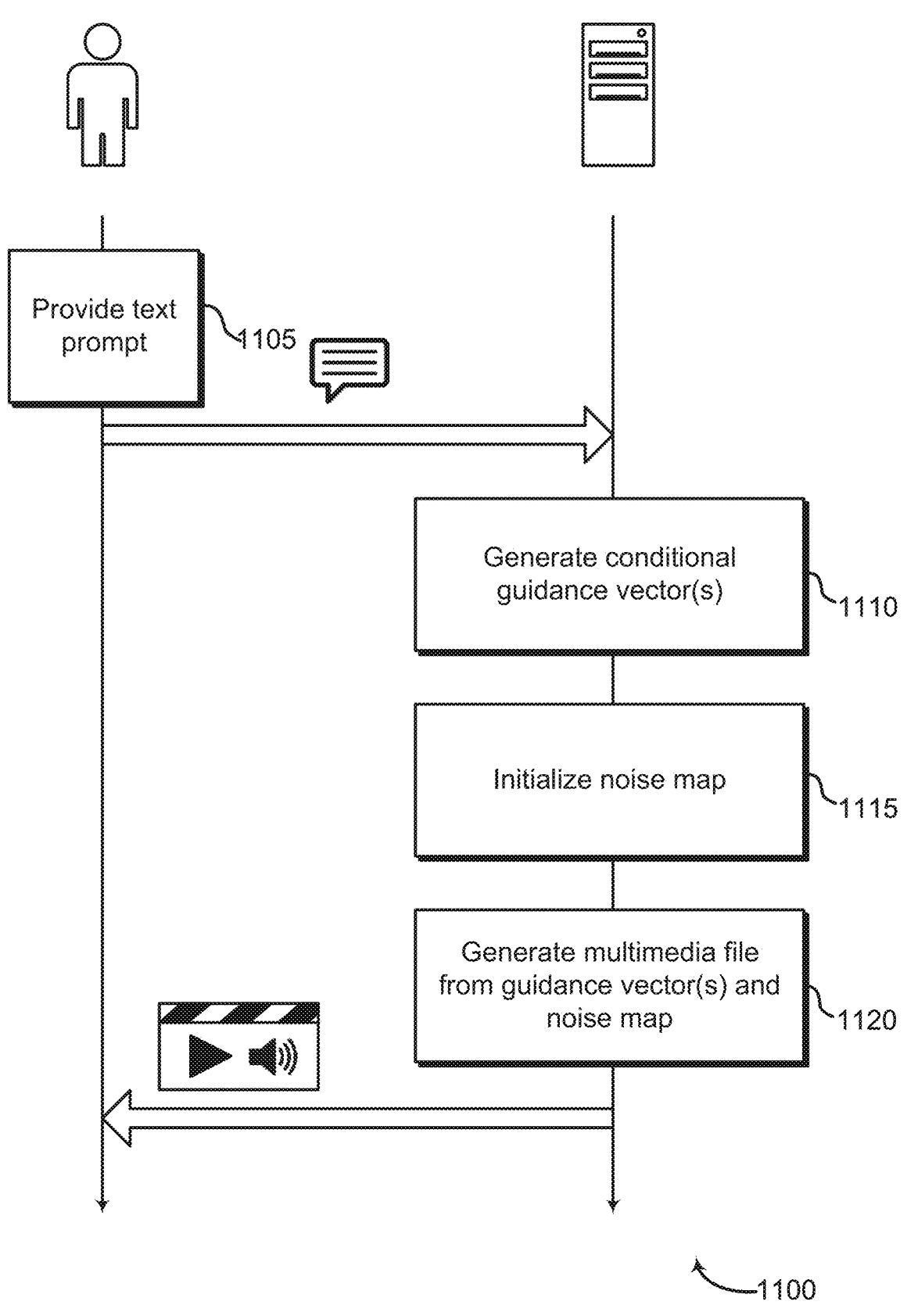
FIG. 11 shows an example of a method for providing a multimedia file to a user according to aspects of the present disclosure.

FIG. 11 shows an example of a method 1100 for conditional image generation according to aspects of the present disclosure. In some examples, method 1100 describes an operation of the audio generation model 235 described with reference to FIG. 2, such as an application of the guided diffusion transformer model described with reference to FIG. 4. In some examples, these operations are performed by a system including a processor executing a set of codes to control functional elements of an apparatus such as the sound processing apparatus described in FIGS. 1 and 2.

Additionally or alternatively, steps of the method 1100 may be performed using special-purpose hardware. Generally, these operations are performed according to the methods and processes described in accordance with aspects of the present disclosure. In some cases, the operations described herein are composed of various substeps or are performed in conjunction with other operations.

At operation 1105, a user provides a text prompt describing content to be included in a generated multimedia file. For example, a user may provide the prompt "a penguin splashing in the water". In some examples, guidance can be provided in a form other than text, such as via an image, a video, or another sound.

At operation 1110, the system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the audio generation model.

At operation 1115, a noise map is initialized that includes random noise. The noise map may be in a pixel space or a latent space. By initializing an image with random noise, different variations of an image including the content described by the conditional guidance can be generated. For example, the system may initialize a noisy latent that is then patch split into noise tokens, as described with reference to FIG. 4.

At operation 1120, the system generates a multimedia based on the noise map and the conditional guidance vector. For example, the image may be generated using an iterative denoising process as described with reference to FIG. 4.

Figure 12:
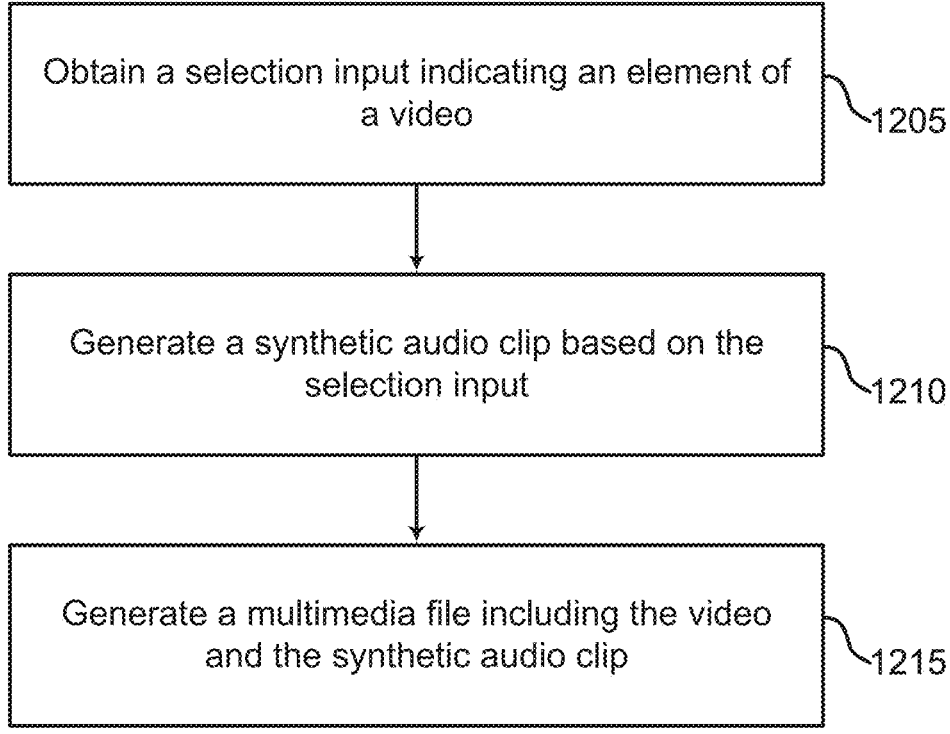
FIG. 12 shows an example of a method for generating a multimedia file according to aspects of the present disclosure.

FIG. 12 shows an example of a method 1200 for generating a multimedia file according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps or are performed in conjunction with other operations.

At operation 1205, the system obtains a selection input indicating an element of a video. In some cases, the operations of this step refer to, or may be performed by, a sound processing apparatus as described with reference to FIG. 1. For example, a user may operate a user interface of the sound apparatus to select a clip on a timeline GUI element.

At operation 1210, the system generates a synthetic audio clip based on the selection input. In some cases, the operations of this step refer to, or may be performed by, an audio generation model as described with reference to FIG. 2. By selecting the clip in operation 1205, the system may interpret the currently displayed frame of the clip (or audio, if an audio clip) as the user's desired conditioning information for generating the sound. Accordingly, embodiments condition the audio generation performed by audio generation model with image or sound features from the selected clip. Alternatively, the user may specify different or additional inputs as described with reference to FIG. 5.

At operation 1215, the system generates a multimedia file including the video and the synthetic audio clip. In some cases, the operations of this step refer to, or may be performed by, a timeline compositor as described with reference to FIG. 2. The timeline compositor may perform a rendering process that combines the video and audio layers by synchronizing their playback timings and encoding them into a unified multimedia format. This rendering process may involve stitching together the media elements from their respective tracks, processing frame compositions for video, mixing the audio to ensure proper alignment, and transcoding the result into a format suitable for export, such as MP4 or WAV, depending on the configuration.

Embodiments of the sound processing system described herein may train the audio generation model using prepared training data. In some cases, the model is trained on large quantity of training data to enhance the model scalability. In some cases, the model is trained to generalize on new classes such as nature sound, non-stationary sound, etc.

In some aspects, the audio generation model is augmented with mask tokens, where the mask tokens indicates whether a token represents audio prompt or represents an extension to be generated. For example, the mask token may be placed in arbitrary position in a sequence, which enables multiple types of audio editing operators. In one aspect, the mask tokens is used for audio extension (e.g., in either forward direction or a backward direction). In some aspects, the model is able to performed audio outpainting (e.g., expanding in forward and backward directions at the same time), inpainting (e.g., regenerating a segment of the audio within the input audio clip), or transition (e.g., generating transitional audio clip that combines a first audio clip and a second audio clip). During the training stage, a random audio prompt is sampled, and the model is trained based on the sampled audio prompt (e.g., either to perform outpainting, inpainting, extension, or transition). In some cases, the model is trained with text conditioning which enables the model to perform text-to-audio generation and text-guided extension.

In some cases, during training, the model is fine-tuned to mitigate hallucination. For example, the model is fine-tuned on a synthetic dataset that includes stationary sounds, which includes ambience, room tone, white noise, etc. In some cases, the synthetic dataset includes 1.3 M hours of noise floor data. For example, the noise floor data includes room tone data and white noise data. Room tone data is an audio dataset from, for example, LibriVox, which is a dataset that contains voice samples of people reading public domain books. In some cases, room tone data is preprocessed to remove the speech. For example, room tone data includes background sound such as room tone or ambient sound. White noise is a sound that contains all audible sound frequencies played at the same intensity. It's often described as a "shh" sound, similar to the sound of a fan, air conditioner, or TV static. In some cases, the white noise is generated to have a target length n of the audio file to be generated.

In some embodiments, the noise floor data is generated by randomly sampling n seconds from a random file of the room tone data. The sampled audio is convolved with the generated white noise of the same length to obtain white noise that matches the frequency response of the room tone thus effectively synthesizing a new and unique n second long audio file containing noise floor. To obtain stereo room tone, the aforementioned process is repeated for each of the two channels. In one aspect, the noise floor dataset includes a total of 100 k files, and n is set to 13.

To mitigate hallucinations, the model is finetuned with the noise floor dataset. For example, the model is trained using the synthesized data. For example, the model is finetuned to generate 10 seconds of forward/backward extensions (i.e., no in-painting) given a 3-second prompt. In some cases, the model is finetuned with different number of finetuning iterations: 10 k, 15 k, and 20 k.

In some embodiments, the system performs audio segmentation which separates the input audio clip into three independent streams: speech, ambience or sound effects, and remaining sounds. In some cases, the foreground sound of the input audio clip include the speech and the background sound of the input audio clip includes the ambience sound effects and the remaining sounds. In some cases, the model extends the background sound while preserving the foreground sound, which enables for useful audio editing operations such as adding room tone, re-timing recorded speech, etc.

Figure 13:
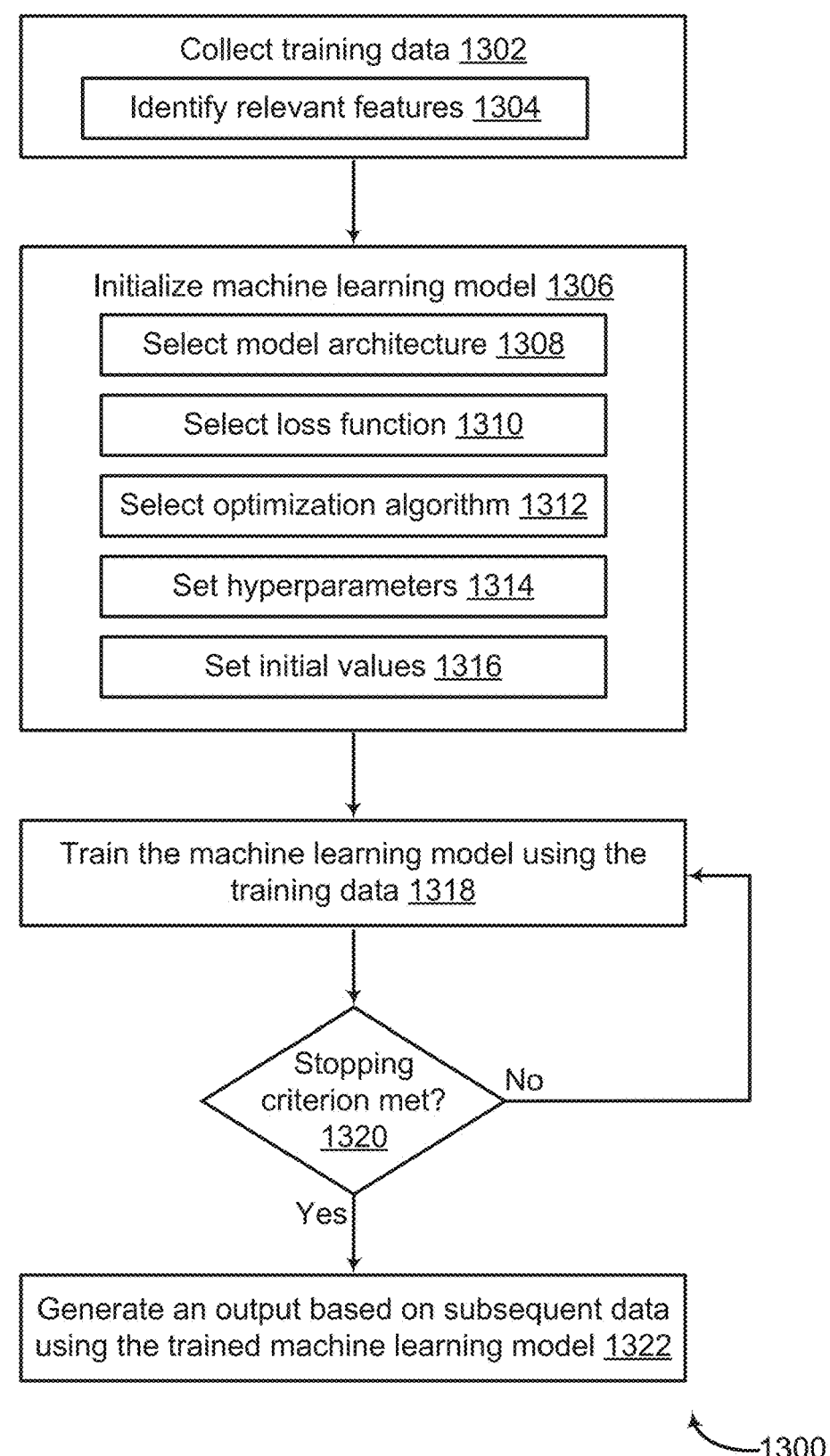
FIG. 13 shows an example of a machine learning (ML) model training algorithm according to aspects of the present disclosure.

FIG. 13 is a flow diagram depicting an algorithm as a step-by-step procedure 1300 in an example implementation of operations performable for training a machine-learning model. The procedure 1300 provides one or more examples of generating training data, use of the training data to train a machine-learning model, and use of the trained machine-learning model to perform a task.

To begin in this example, a machine-learning system collects training data (block 1302) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 1304) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 1306). Initialization of the machine-learning model includes selecting a model architecture (block 1308) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 1310). The loss function is utilized to measure a difference between an output of the machine-learning model (i.e., predictions) and target values (e.g., as expressed by the training data) to be used to train the machine-learning model. Additionally, an optimization algorithm is selected (1312) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 1314) examples of which includes initializing weights and biases of nodes to improve efficiency in training and computational resources consumption as part of training. Hyperparameters are also set that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 1318) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 1320), i.e., which is used to validate the machine-learning model. The stopping criterion is usable to reduce overfitting of the machine-learning model, reduce computational resource consumption, and promote the ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 1320), the procedure 1300 continues training of the machine-learning model using the training data (block 1318) in this example.

If the stopping criterion is met ("yes" from decision block 1320), the trained machine-learning model is then utilized to generate an output based on subsequent data (block 1322). The trained machine-learning model, for instance, is trained to perform a task as described above and therefore, once trained is configured to perform that task based on subsequent data received as an input and processed by the machine-learning model.

Figure 14:
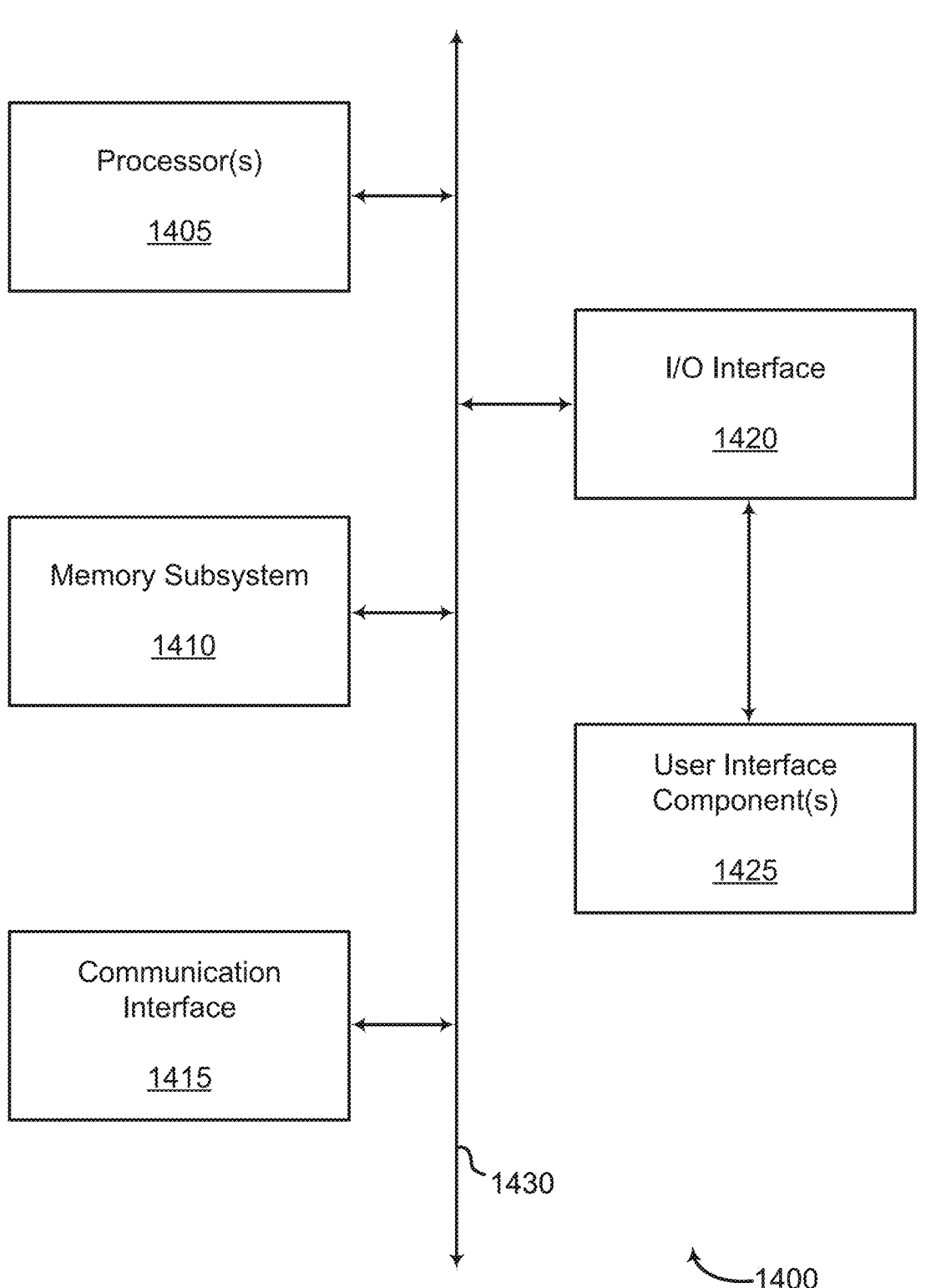
FIG. 14 shows an example of a computing device according to aspects of the present disclosure.

FIG. 14 shows an example of a computing device 1400 according to aspects of the present disclosure. The example shown includes computing device 1400, processor(s) 1405, memory subsystem 1410, communication interface 1415, I/O interface 1420, user interface component(s), and channel 1430.

In some embodiments, computing device 1400 is an example of, or includes aspects of, a sound processing apparatus as described in FIGS. 1 and 2. In some embodiments, computing device 1400 includes one or more processors 1405 are configured to execute instructions stored in memory subsystem 1410 to obtain a selection input indicating an element of a video; generate, using an audio generation model, a synthetic audio clip based on the selection input; and generate a multimedia file including the video and the synthetic audio clip.

According to some aspects, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating systems. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote-control device interfaced with a user interface directly or through the I/O controller), or a combination thereof. In some cases, user interface component(s) 1425 include a GUI.

Accordingly, the present disclosure includes the following aspects.

A method for sound generation is described. One or more aspects of the method include obtaining a selection input indicating an element of a video; generating, using an audio generation model, a synthetic audio clip based on the selection input; and generating a multimedia file including the video and the synthetic audio clip.

Some examples of the method, apparatus, non-transitory computer readable medium, and system further include displaying a video timeline interface for the video, wherein the selection input is obtained via the video timeline interface. Some examples further include obtaining a text input describing an audio element, wherein the synthetic audio clip is generated based on the text input. Some examples further include generating the text input based on the element of the video.

Some examples of the method, apparatus, non-transitory computer readable medium, and system further include identifying a set of frames including the element of the video, wherein the synthetic audio clip is generated based on the set of frames. Some examples further include obtaining a semantic adjustment input indicating a volume for the element of the video. Some examples further include generating an additional synthetic audio clip based on the semantic adjustment input.

Some examples of the method, apparatus, non-transitory computer readable medium, and system further include obtaining a sound dynamics input, wherein the synthetic audio clip is generated based on the sound dynamics input. Some examples of the method, apparatus, non-transitory computer readable medium, and system further include generating an additional synthetic audio clip, wherein the multimedia file includes the synthetic audio clip and the additional synthetic audio clip.

A non-transitory computer readable medium storing code for sound generation is described. One or more aspects of the method include displaying a video timeline interface for a video; obtaining, via the video timeline interface, a selection input indicating an element of the video; and generating, using an audio generation model, a synthetic audio clip based on the selection input.

Some examples of the method, apparatus, non-transitory computer readable medium, and system further include determining a foreground subject in a frame of the video upon obtaining the selection input. Some examples further include obtaining a text input describing an audio element, wherein the synthetic audio clip is generated based on the text input. Some examples further include generating the text input based on the element of the video.

Some examples of the method, apparatus, non-transitory computer readable medium, and system further include identifying a set of frames including the element of the video, wherein the synthetic audio clip is generated based on the set of frames. Some examples further include obtaining a semantic adjustment input indicating a volume for the element of the video. Some examples further include generating an additional synthetic audio clip based on the semantic adjustment input. Some examples further include generating a multimedia file including the video and the synthetic audio clip.

An apparatus for sound generation is described. One or more aspects of the apparatus include a memory component; a processing device coupled to the memory component, the processing device configured to perform operations comprising: obtaining a selection input indicating an element of a video; generating, using an audio generation model, a synthetic audio clip based on the selection input; and generating a multimedia file including the video and the synthetic audio clip.

Some examples of the apparatus, system, and method further include displaying a video timeline interface for the video, wherein the selection input is obtained via the video timeline interface. Some examples further include obtaining a text input describing an audio element, wherein the synthetic audio clip is generated based on the text input. Some examples further include identifying a set of frames including the element of the video, wherein the synthetic audio clip is generated based on the set of frames. Some examples further include obtaining a semantic adjustment input indicating a volume for the element of the video. Some examples further include generating an additional synthetic audio clip based on the semantic adjustment input.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the concepts described. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The methods described may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a video and a selection input indicating a portion of the video;

generating, using an audio generation model, a synthetic audio clip corresponding to the portion of the video by performing a diffusion denoising process; and generating a multimedia file including the video and the synthetic audio clip, wherein the multimedia file includes the synthetic audio clip at the portion of the video indicated by the selection input.

2. The method of claim 1, wherein obtaining the selection input comprises:

displaying a video timeline interface for the video, wherein the selection input is obtained via the video timeline interface.

3. The method of claim 1, further comprising:

obtaining a text input describing an audio element, wherein the synthetic audio clip is generated based on the text input.

4. The method of claim 3, wherein obtaining the text input comprises:

generating the text input based on the portion of the video.

5. The method of claim 1, further comprising:

identifying a set of frames including the portion of the video, wherein the synthetic audio clip is generated based on the set of frames.

6. The method of claim 1, further comprising:

obtaining a semantic adjustment input indicating a volume for the portion of the video; and generating an additional synthetic audio clip based on the semantic adjustment input.

7. The method of claim 1, further comprising:

obtaining a sound dynamics input, wherein the synthetic audio clip is generated based on the sound dynamics input.

8. The method of claim 1, further comprising:

generating an additional synthetic audio clip, wherein the multimedia file includes the synthetic audio clip and the additional synthetic audio clip.

9. A non-transitory computer readable medium storing code for sound processing, the code comprising instructions that, when executed by at least one processor, cause the at least one processor to perform operations comprising:

displaying a video timeline interface for a video;

obtaining, via the video timeline interface, a selection input indicating a portion of the video;

generating, using an audio generation model, a synthetic audio clip at to the portion of the video indicated by the selection input by performing a diffusion denoising process.

10. The non-transitory computer readable medium of claim 9, code further comprising instructions that, when executed by the at least one processor, cause the at least one processor to perform operations comprising:

determining a foreground subject in a frame of the video upon obtaining the selection input.

11. The non-transitory computer readable medium of claim 9, the code further comprising instructions that, when executed by the at least one processor, cause the at least one processor to perform operations comprising:

obtaining a text input describing an audio element, wherein the synthetic audio clip is generated based on the text input.

12. The non-transitory computer readable medium of claim 11, wherein obtaining the text input comprises:

generating the text input based on the portion of the video.

13. The non-transitory computer readable medium of claim 9, the code further comprising instructions that, when executed by the at least one processor, cause the at least one processor to perform operations comprising:

identifying a set of frames including the portion of the video, wherein the synthetic audio clip is generated based on the set of frames.

14. The non-transitory computer readable medium of claim 9, the code further comprising instructions that, when executed by the at least one processor, cause the at least one processor to perform operations comprising:

obtaining a semantic adjustment input indicating a volume for the portion of the video; and generating an additional synthetic audio clip based on the semantic adjustment input.

15. The non-transitory computer readable medium of claim 9, the code further comprising instructions that, when executed by the at least one processor, cause the at least one processor to perform operations comprising:

generating a multimedia file including the video and the synthetic audio clip.

16. A system for sound processing, comprising:

a memory component;

a processing device coupled to the memory component, the processing device configured to perform operations comprising:

obtaining a video and a selection input indicating a portion of the video;

generating, using an audio generation model, a synthetic audio clip corresponding to the portion of the video by performing a diffusion denoising process; and generating a multimedia file including the video and the synthetic audio clip, wherein the multimedia file includes the synthetic audio clip at the portion of the video indicated by the selection input.

17. The system of claim 16, the system further comprising:

displaying a video timeline interface for the video, wherein the selection input is obtained via the video timeline interface.

18. The system of claim 16, the system further comprising:

obtaining a text input describing an audio element, wherein the synthetic audio clip is generated based on the text input.

19. The system of claim 16, the system further comprising:

identifying a set of frames including the portion of the video, wherein the synthetic audio clip is generated based on the set of frames.

20. The system of claim 16, the system further comprising:

obtaining a semantic adjustment input indicating a volume for the portion of the video; and generating an additional synthetic audio clip based on the semantic adjustment input.

* * * * *